Patented June 20, 1933

1,914,556

UNITED STATES PATENT OFFICE

COURTNEY CONOVER, OF ST. LOUIS, MISSOURI, ASSIGNOR TO MONSANTO CHEMICAL WORKS, OF ST. LOUIS, MISSOURI, A CORPORATION OF MISSOURI

PURIFICATION OF MALEIC ACID

No Drawing.  Application filed March 26, 1930. Serial No. 439,229.

This invention relates to the manufacture of carboxylic acids and it has particular application to the separation of impurities commonly associated with these acids when manufactured by the oxidation of aromatic hydrocarbons.

Maleic acid is produced in varying amounts when aromatic hydrocarbons, such as benzene, toluene, xylene or naphthalene vapors are caused to react with oxygen at elevated temperatures and in the presence of a vanadium catalyst. When naphthalene is employed phthalic anhydride is first separated from the effluent reacted vapors by cooling the same, after which the maleic acid may be separated by scrubbing the vapors with water. Among other impurities which accumulate in the scrubbing liquors are quinones, aldehydes and tar compositions, which are separated from the maleic acid only with difficulty.

It is the object of this invention to provide a method of purifying acids made by oxidation of hydrocarbons such as maleic acid, whereby a pure, substantially colorless product may be obtained.

According to the present invention the crude maleic acid solution when sufficiently concentrated is treated with a suitable oxidizing agent, such as nitric acid, after which the solution is digested or boiled and at the same time concentrated further. Subsequently the solution is cooled after which a small amount of charcoal and barium carbonate are added to absorb colored impurities and precipitate inorganic sulphates respectively. The resulting decolorized solution is filtered and thereafter concentrated, preferably at reduced pressures in order to separate the acid product from its solution by crystallization.

Various oxidizing agents may be employed such as hydrogen peroxide, organic acid peroxides, nitric acid, which is preferred, or materials which, under the existing conditions, react to produce nitric acid. The concentration of the solution to which the nitric acid is added is largely optional; satisfactory results are obtained when the solution contains from 20 to 30 per cent of maleic acid. For the purpose of absorbing the coloring matter charcoal is easily available and effective. It may, however, be displaced either wholly or in part by other decolorizing agents, which are inert under the prevailing conditions, such as fuller's earth, bone char or other adsorptive agents.

Inasmuch as maleic acid undergoes rearrangement to form fumaric acid when exposed to elevated temperatures for prolonged periods, it is desirable to effect the concentration after filtration and decolorization, at reduced pressures. A pressure of 150 mm. operates satisfactorily; however, pressures from 25 to 50 mm. are advantageous. Yields of substantially colorless crystals varying from 60 to 85 percent of the total maleic acid are thus obtained upon cooling. The product will be found to be light in color and relatively free from foreign matter.

A specific example of the application of the principles of the invention is hereinafter set forth. A crude maleic acid solution which contains from 20 to 30 percent of the acid may be obtained by scrubbing the gases resulting from the partial oxidation of naphthalene, which gases have previously been cooled sufficiently to precipitate the phthalic anhydride. The solution is treated with 3½ pounds of nitric acid (specific gravity 1.42) for each 100 pounds of maleic acid present in the water solution. The solution is boiled until the specific gravity reaches 1.160 (at 25° C.) after which it is cooled, and mixed with approximately 5 percent charcoal, calculated upon the basis of the maleic acid.

In the event the water contains inorganic sulphates, these may be removed conveniently by adding a small amount of barium carbonate. After stirring for approximately one hour the charge is filtered and the clear filtrate, concentrated under vacuum until upon cooling 60 to 85 percent of the maleic acid crystallizes from the liquors. A vacuum of 150 mm. is sufficient to obtain a liquor, which upon cooling yields 75 per cent of its maleic acid in crystalline form without substantial fumaric acid formation.

Although there has been described but a single specific embodiment of my invention and I have indicated various modifications which may be instituted, it will be apparent that the invention is not limited to the specific disclosure but contemplates broadly the oxidation of impurities present in an acid solution such as is obtained by scrubbing the effluent gases from a partial hydrocarbon oxidation process and subsequently or simultaneously treating the oxidized solution to the action of a decolorizing agent.

What I claim is:

1. In the manufacture of maleic acid by the partial oxidation of an aromatic hydrocarbon that step in the purification of the crude acid product which consists in boiling the crude acid in the presence of an aqueous solution of a material selected from a group consisting of the following: hydrogen peroxide, organic acid peroxides, nitric acid and materials which under the conditions of the treatment form nitric acid, whereby the impurities are oxidized and rendered separable by adsorption and filtration.

2. In the manufacture of maleic acid by the partial oxidation of an aromatic hydrocarbon that step in the purification of the crude maleic acid which consists in boiling the crude maleic acid in a dilute aqueous solution of nitric acid whereby impurities associated with the crude maleic acid are rendered separable by adsorption and filtration.

3. The method as defined in claim 2 and further characterized in that the resulting solution is treated with an adsorptive agent after which it is filtered and the maleic acid present in the solution recovered therefrom.

4. The method as defined in claim 2 and further characterized in that the resulting solution is treated with an adsorptive agent and sufficient barium carbonate to react all of the sulphate impurities after which the mixture is filtered and the maleic acid recovered from the solution by crystallization.

In testimony whereof, I affix my signature.

COURTNEY CONOVER.